United States Patent [19]

Tennstedt

[11] Patent Number: 4,961,350

[45] Date of Patent: Oct. 9, 1990

[54] FITTABLE PIPETTE TIP CONSISTING OF A VESSEL WHICH IS DESIGNED TO FIT A PARTICULARLY CONICAL FITTING HEAD OF A PIPETTE

[75] Inventor: Ernst Tennstedt, Hamburg, Fed. Rep. of Germany

[73] Assignee: Firma Eppendorf-Netheler-Hinz GmbH, Hamburg, Fed. Rep. of Germany

[21] Appl. No.: 376,377

[22] Filed: Jul. 6, 1989

[30] Foreign Application Priority Data

Jul. 21, 1988 [DE] Fed. Rep. of Germany ....... 3824767

[51] Int. Cl.5 .............................. B01L 3/02; G01N 14

[52] U.S. Cl. .............................. 73/864.01; 73/864.14

[58] Field of Search .......................... 73/864.14, 864.01

[56] References Cited

U.S. PATENT DOCUMENTS 3,732,734 5/1973 Avakian .......................... 73/864.14
4,349,109 9/1982 Scordato et al. ............... 206/486 X
4,679,446 7/1987 Sheehan et al. ............. 73/864.14 X
4,748,859 6/1988 Magnussen, Jr. et al. ... 73/864.14 X

*Primary Examiner*—Tom Noland
*Attorney, Agent, or Firm*—Toren, McGeady & Associates

[57] ABSTRACT

A fittable pipette tip consists of a vessel which is designed to fit a particularly conical fitting head of a pipette and which may be conical and has a fitting top opening and a bottom opening for receiving and discharging a pipette. A sealing portion with which the pipette tip is adapted to contact the fitting head is spaced from the top end of the pipette tip and is formed with a smooth inside seating surface and has a smaller wall thickness than other portions of the pipette tip so that the sealing portion of the pipette tip is yieldable for adaptation to the fitting head. The pipette tip is reduced in wall thickness at least in the sealing portion by a provision of recesses in the outside and inside surfaces of the wall of the pipette tip.

9 Claims, 3 Drawing Sheets

FITTABLE PIPETTE TIP CONSISTING OF A VESSEL WHICH IS DESIGNED TO FIT A PARTICULARLY CONICAL FITTING HEAD OF A PIPETTE

BACKGROUND OF THE INVENTION

1. Field of the Invention

This invention relates to a fittable pipette tip consisting of a vessel which is designed to fit a particularly conical fitting head of a pipette and which may be conical and has a fitting top opening and a bottom opening for receiving and discharging a pipette, wherein a sealing portion with which the pipette tip is adapted to contact the fitting head is spaced from the top end of the pipette tip and is formed with a smooth inside seating surface and has a smaller wall thickness than other portions of the pipette tip so that said sealing portion of the pipette tip is yieldable for adaptation to said fitting head.

The invention also relates to such a pipette tip which consists of a vessel which is conical at least in part and in which the sealing portion is spaced from the fitting opening provided at the top end of the pipette tip and has a smooth seating surface.

Alternatively, the housing may have a cylindrical bottom end portion.

The reference to a smooth seating surface is also applicable to a roughened surface. The provision of a slightly profiled seating surface for making an improved seal with the conical fitting head is included. But a smooth seating surface will generally be preferred.

The fitting head of a pipette may consist of a cone, which is formed with a through passage and is inserted into the conical wall portion of the pipette tip. Such fitting cone may alternally be provided on and protrude outwardly from a tip portion of the pipette and may constitute a protruding ring so that the fitted pipette tip will be in sealing contact with the pipette only at said cone.

To provide a sealing seat, the outwardly protruding fitting head may have a crowned surface in its annular seating portion. This will ensure a sealing contact, particularly with an elastic and yieldable seating surface of the pipette tip. The elasticity will ensure that the pipette tip will adapt itself to the annular seat portion of the fitting head in sealing contact therewith.

2. Description of the Prior Art

Pipette tips having a conical seating surface are known, e.g., from German patent specification No. 10 90 449. They are intended to be fitted on a fitting cone which has a suitable taper throughout its length. Whereas the fittable tip may be yieldable, this will permit only a small adaptation of the conical socket of the tip to the fitting cone of the pipette and leaks have often occurred in the practical use of such assemblies.

German patent specification No. 12 91 142 discloses a pipetting device comprising a fitted pipette tip which has at its top a stabilizing protruding rim. The wall thickness of the pipette tip is constant from top to bottom. In its top portion, which comprises the sealing portion, the pipette tip is stiffened by axial ribs on the wall. A stiffening is desired particularly at the seating surface. But that measure also has not resulted in a reliable seal.

The same disadvantage is inherent in the design disclosed in East German patent specification No. 50,016. In accordance therewith the fittable vessel has a conical seat that is to be fitted on a correspondingly tapered fitting head of the pipette. The rim around the top opening is stiffened by a bead.

A stiffening of the seating portion of a fittable pipette tip has been disclosed in U.S. Pat. No. 3,732,734, where the fitting portion is reinforced by a peripheral annular outer wall portion which protrudes outwardly to form a shoulder. Whereas annular ribs are provided on the inside surface, there are no thinner wall portions which would render the wall flexible but the ribs constitute only peripheral annular sealing strips and at their base merge into a virtually undeformable wall portion of the pipette tip. Even adjacent to said ribs said wall portion has a basically conical shape just as the fitting head of the pipette.

Such ribs do not ensure a reliable fitting and do not constitute a virtually smooth seating surface. That known pipette tip has, e.g., only a peripheral flange at the top whereas elsewhere the wall thickness is constant substantially throughout the length of the pipette tip. The wall is possibly reduced in thickness only adjacent to the dispensing bottom opening.

U.S. Pat. No. 4,349,109 discloses a pipette tip which is composed of a plurality of sections. The uppermost of said sections is frustoconical and its conical inside surface has a taper of, e.g., 3 degrees for an interference fit with a mating surface of a pipette. In that section, which is formed with the seating surface for sealing contact, the pipette tip has the largest wall thickness and for this reason said section is particularly unyieldable. From said seating surface a downwardly flaring shoulder surface extends to the bottom wall section of the pipette tip. That bottom wall section has an inside surface which is inwardly offset from the seating surface of the top section so that the pipette tip can be fitted also on pipettes which have a smaller volume. But owing to the outwardly protruding wall of the top section the bottom section is particularly strong and unyieldable at its top rim. For this reason the pipette tip is not adaptable and has no overlapping profiled inside surfaces because the inside surfaces are offset from each other transversely to a center line.

A fittable pipette tip of the kind described hereinbefore has been disclosed in German patent specification 25 26 296. That known pipette tip has in its sealing portion a smaller wall thickness for adaptation to the conical fitting head. For this purpose the pipette tip must be made of a material, particularly plastic, which is particularly elastic and at least flexible and preferably tends to restore itself when it has been expanded. A rubber material has been mentioned as well as a commercially available plastic known as polypropylene.

From the last-mentioned publication it is also apparent that the yieldability and adaptability provided to improve the fit is intended to compensate dimensional inaccuracies of the pipette tip and of the fitting head of the pipette so that larger manufacturing tolerances will be permitted and an improved seal will be obtained. The forces which must be exerted to fit the pipette tip on the pipette and to remove the pipette tip from the pipette should be reduced.

The design of the known pipette tip with a portion having a smaller wall thickness has proved satisfactory. In that portion the wall thickness is reduced by the provision of an annular peripheral recess or of grooves in the outside surface. The portion which is recessed on the outside may have a smaller wall thickness at the top rim of the sealing portion than at the bottom end of the pipette. An external annular shoulder surface may be formed at the top end of the sealing portion and the wall thickness of the pipette tip may gradually decrease toward the top in the sealing portion.

Such a recess in the outside surface will be preferred because such pipette tips can conveniently be made by suitable injection molds. But it has been found in practice that such pipette tips can be removed from the mold only with difficulty unless undercuts are avoided. Particularly with slender pipette tips having only a small taper it is very difficult to sufficiently reduce the wall thickness in the sealing portion and to obtain a constant reduced wall thickness throughout a defined sealing zone. The wall thickness usually varies in the sealing portion. Besides, in such pipette tips the sealing portion cannot easily be detected with the eye so that the user may be uncertain how the pipette tip is to be properly handled.

SUMMARY OF THE INVENTION

For this reason and particularly in view of the known design discussed last it is an object of the invention to provide pipette tips in which the wall thickness in an axially defined, clearly visible sealing portion can be reduced to any desired, selected extent and which can be made without undesirable undercuts which would render the removal of the pipette tip from an injection mold more difficult, and to achieve this even if the pipette tip is slender and has a small taper or is at least approximately cylindrical.

That object is accomplished in accordance with the invention in that the pipette tip is reduced in wall thickness at least in the sealing portion by a provision of recesses in the outside and inside surfaces of the wall of the pipette tip. The provision of recesses in the inside and outside surfaces of the wall of the pipette tip will afford the advantage that the wall thickness in the seating or sealing portion is more uniform and may possibly be constant throughout the sealing portion.

In a preferred embodiment the object is accomplished in that the wall of the pipette tip is formed in its outside surface with an upwardly extending recess and in its inside surface with a downwardly extending recess and said recesses overlap in a defined sealing portion of said wall.

Such a recess formed in the wall of a pipette tip extends from an unrecessed portion of said wall and is terminated by a shoulder surface. The shoulder surface at the end of the recess in the inside surface of the wall is closer to the top opening of the pipette tip than the shoulder surface at the end of the recess in the outside surface of said wall.

That design will afford the surprising advantage that even pipette tips having a small taper may have a distinctly visible sealing portion, in which the recesses in the inside and outside surfaces of the wall of the pipette tip overlap and which is clearly defined at its top and bottom and ensures a reliable seal, whereas the pipette tip has a larger wall thickness in other portions.

A disadvantage which is involved in the prior art resides in that the wall thickness varies, e.g., decreases in an upward direction. The provision of a recess also in the inside surface of the wall of a pipette tip in accordance with the invention affords the additional advantage that the pipette tip may be formed with portions having specific selected wall thicknesses.

Because the recess formed in the outside surface extends upwardly and the recess formed in the inside surface extends downwardly, an annular shoulder surface will be formed at one end of each recess. A further advantage resides in that the annular shoulder surface on the inside surface may be used as a stop surface for engaging the fittable head of the pipette, so that a defined, reproducible fit will be obtained.

If a recess is formed only in the outside surface and extends upwardly toward the top opening of the pipette tip and is terminated by an upwardly flaring annular shoulder surface leading to a portion which has the normal wall thickness, such recess will have a limited depth so that the wall thickness of the sealing portion will undesirably vary, i.e., will gradually decrease from bottom to top. If a recess is formed also in the inside surface of the wall the wall thickness of the seating or sealing portion may be more uniform and may even be constant throughout the length of the sealing portion and specific wall thickness variations may be selected.

In an embodiment in which a recess having an upwardly increasing depth is formed in the outside surface and is terminated by an upwardly flaring shoulder surface leading to a wall portion which has the normal wall thickness, a preferred feature of the invention resides in that a recess having a downwardly increasing depth is formed in the inside surface and is terminated at its bottom end by a downwardly tapered annular shoulder surface. The downwardly tapered annular shoulder surface formed on the inside surface may have a small taper of an order of 30 degrees. That design will result in a smooth transition on the inside surface. It may be assumed that an enlarged fitting head will have only a limited axial length so that a transitional surface having only a small taper will ensure an improved fit if the material of the pipette tip owing to its elasticity will exert a controlled contracting force when the pipette tip has been fitted on the fitting head.

In a particular preferred embodiment the recesses formed in the outside and inside surfaces have depths which increase in mutually opposite directions and are defined by substantially parallel surfaces of the sealing portion of the pipette tip.

That design will result in an improved fit of the pipette tip on the fitting head if the latter is conical or crowned and particularly the fit on a crowned fitting head will be improved whereas the forces required to fit the pipette tip on the fitting head and to remove the pipette tip from the fitting head will be relatively small. In that embodiment the inner annular shoulder surface preferably constitutes also a stop for the conical fitting head so that a defined reproducible fit will be ensured.

In a preferred embodiment, the provision of recesses having depths which increase in mutually opposite directions in the inside and outside surfaces of the wall of the pipette tip will have the result that the inside and outside surfaces of the wall of the pipette tip will comprise a surface portion which is oblique to the imaginary bisecting surface of the wall of the conical pipette tip and said surface portion has at least a smaller taper than said imaginary bisecting surface of the wall.

If the wall thickness is constant in the sealing portion, tapers may be selected which are desirable in view of certain operating conditions and variations of the taper may be selected to provide specific conditions which facilitate the fitting and removal of the pipette tip.

In a particularly preferred embodiment, the increase of the depth of the recesses in mutually opposite directions has the result that the conical pipette tip is formed on each of its inside and outside surfaces with a surface portion which is oblique to the imaginary bisecting surface of the wall of the pipette tip and substantially cylindrically surrounds the center line of the pipette tip. That design will result in a desirable fit if the fitting head of the associated pipette has an outwardly protruding, crowned step, which has equal top and bottom diameters so that a particularly tight and firm fit will be obtained if a normally cylindrical, but elastically expansible seating portion of the pipette tip is fitted on said crowned portion and the pipette and the pipette tip are thus connected by a virtually articulated joint.

In that case the axes of the pipette tip and the pipette may be misaligned within certain limits, if desired, without an elimination of the seating engagement or a reduction of the seal and in combination with the inner annular shoulder surface a defined and reproducible fit may be obtained as has been described hereinbefore. In that connection the firmness of the fit may desirably be improved in that the provision of recesses having depths increasing in mutually opposite directions results on the inside and outside surfaces in a formation of surface portions which are oblique to the imaginary bisecting surface of the wall of the conical pipette tip and which constitute cones that surround the center line of the pipette tip and flare downwardly in a direction which is opposite to the flaring of the cone formed by the continuous wall of the pipette tip.

Whereas that design will involve a certain undercut, that undercut will not be detrimental but, on the contrary, when the mold is opened will tend to hold the pipette tip on the core of the mold until the pipette tip is stripped off by an ejector. That fact will result in a performance of desirable, reproducible molding cycles. Another advantage which is afforded by that embodiment is due to the elasticity of the material and resides in that a certain snap action or snap fastener action will be obtained and in combination with the stop constituted by the annular shoulder surface on the inside surface of the wall of the pipette tip will result in a particularly reliable and defined fit of the pipette tip.

It is apparent that the design in accordance with the invention calling for recesses on the inside and outside surfaces affords advantages and in the preferred embodiment permits the pipette tip to be made by a particularly simple mold having no sliding carriages as would be required in the case of undercuts. In properly designed mold the overlapping recesses in the outside and inside surfaces of the wall of the pipette tip will be formed in each molding cycle when the inner and outer mold sections are assembled.

DETAILED DESCRIPTION OF THE PREFERRED EMBODIMENTS

Figure 1:
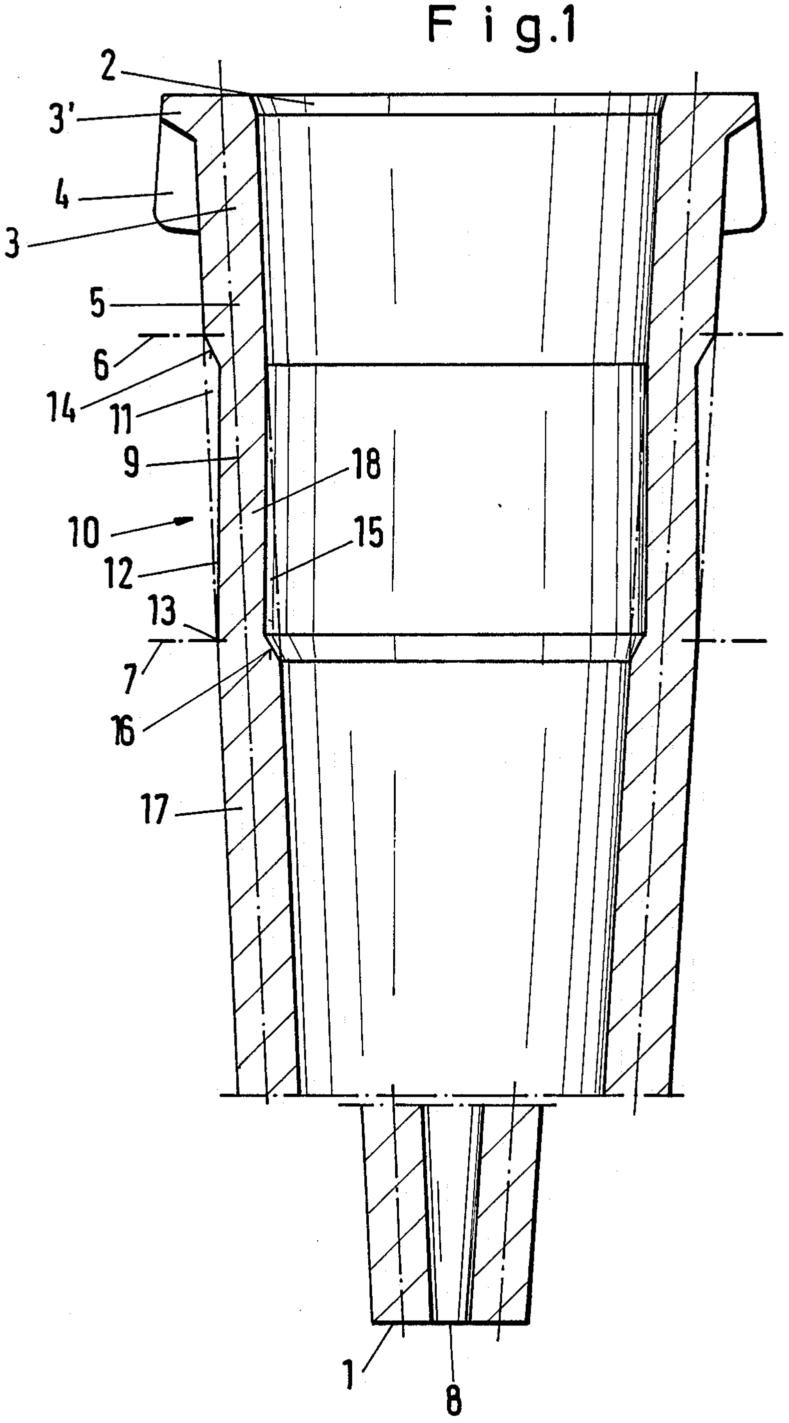
FIG. 1 is a fragmentary vertical longitudinal sectional view showing a pipette tip which embodies the invention.

The invention will be explained hereinafter with reference to illustrative embodiments which are shown on the drawing.

The pipette tip 1 has a top opening 2, which may be defined by a flaring chamfered surface. Below that top opening, the top portion of the pipette tip comprises a relatively thick wall portion 3, which is stiffened by external ribs 4 so that said top portion has a high stability. Above the wall portion 3, the pipette tip may be provided at its top rim with an external peripheral annular flange 3'.

The wall portion 3 having a constant wall thickness extends as far as to a wall portion 5, which is terminated at a radial plane 6. The wall portion which depends from the radial plane 6 comprises the sealing portion 10, which extends as far as to a radial plane 7. Under the radial plane 7, the pipette tip has a wall portion 17 which has approximately the same wall thickness as the wall portion 3 above the transverse plane 6 and which terminates at a receiving and dispensing opening 8 at the bottom end of the pipette tip. Alternatively the wall thickness below the sealing portion may decrease as far as to the bottom opening.

The imaginary bisecting surface of the wall of the conical body of the pipette tip is indicated by the phantom line 9, which extends at the center of the thickness of the wall portions 3 and 17 above the radial plane 6 and below the radial plane 7.

The sealing portion 10 extends between the radial planes 6 and 7 but may terminate short of said radial planes. That sealing portion has a smaller wall thickness.

The outside surface of the sealing portion 10 is formed with an annular peripheral recess 11, which has an inner axial peripheral surface 12, which extends at an oblique angle to the imaginary bisecting surface 9 of the wall portions 3 and 17 of the pipette tip and is cylindrical or has a smaller taper than said bisecting surface. At its bottom end 13, at or near the radial plane 7, the peripheral surface 12 adjoins the outside surface of a wall portion 17 having the normal wall thickness. At its top end, the peripheral surface 12 is connected by an upwardly flaring, conical annular shoulder surface 14 to the wall portion 3 which has the normal wall thickness. If only that recess 11 were provided, the wall thickness would vary in the sealing portion 10. In the embodiment which is described a corresponding recess 15 is formed in the inside surface of the wall of the pipette tip. That recess 15 begins at the shoulder surface 14 and increases in depth in a downward direction approximately to the level of the point 13 of the recess 11 formed in the outside surface. Because the recess 15 formed in the inside surface increases in depth in the downward direction, that recess 15 is terminated at its bottom end by a downwardly flaring, conical shoulder surface 16 leading to the wall portion 17 of the pipette tip. That wall portion 17 has the normal thickness. The downwardly flaring conical annular shoulder surface 16 has a taper of, e.g., 30°.

It is apparent that the recess 11 formed in the outside surface of the wall of the pipette tip extends upwardly and the recess 15 formed in the inside surface of the wall of the pipette tip extends downwardly. In that connection a recess is said to extend in the direction in which it increases in depth. It is also apparent that the two recesses 11 and 15 overlap.

If the recesses 11 and 15 formed in the outside and inside surfaces of the wall of the pipette tip have parallel surfaces defining an interposed wall portion 18, that wall portion 18 will have a uniform wall thickness throughout the length of the sealing portion 10.

Figure 2:
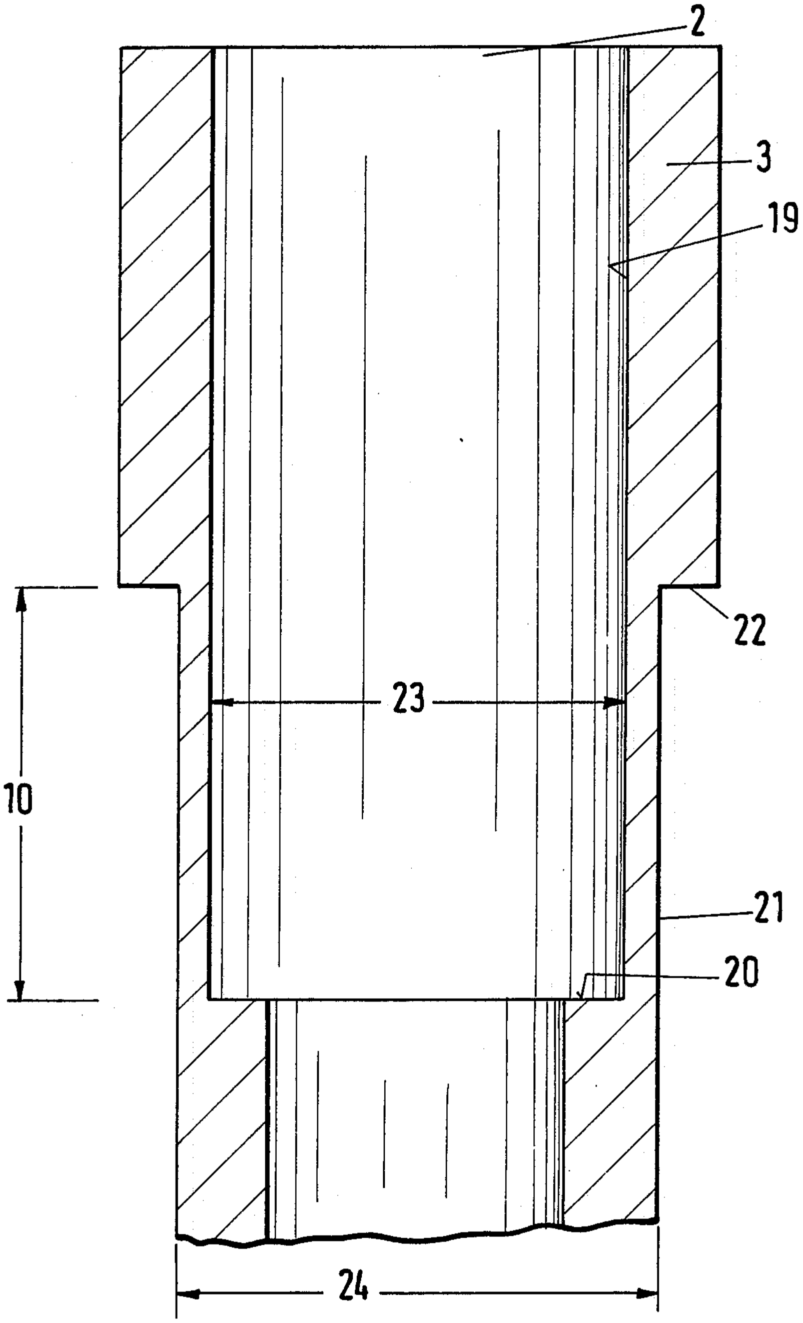
FIG. 2 is a fragmentary sectional view showing a cylindrical top portion of a pipette tip.

The pipette tip shown in FIG. 2 has a cylindrical top portion. The wall portion 3 depending from the top opening 2 has a normal, substantial wall thickness. The inside surface of the wall of the pipette tip is formed with a cylindrical recess 19, which extends downwardly from the top opening 2 and is terminated at its bottom end by an annular shoulder surface 20.

The outside surface is formed with an upwardly extending recess 21, which is terminated at its top end by a downwardly tapering annular shoulder surface 22. Between the annular shoulder surfaces 20 and 22 tapering in mutually opposite directions the sealing portion 10 is disposed, in which the two recesses overlap so that the wall thickness is much smaller in said sealing portion than elsewhere. The inside diameter 23 and the outside diameter 24, i.e., the depths of the recesses 19 and 21, may be selected so that the sealing portion 10 has a very small wall thickness.

Figure 3:
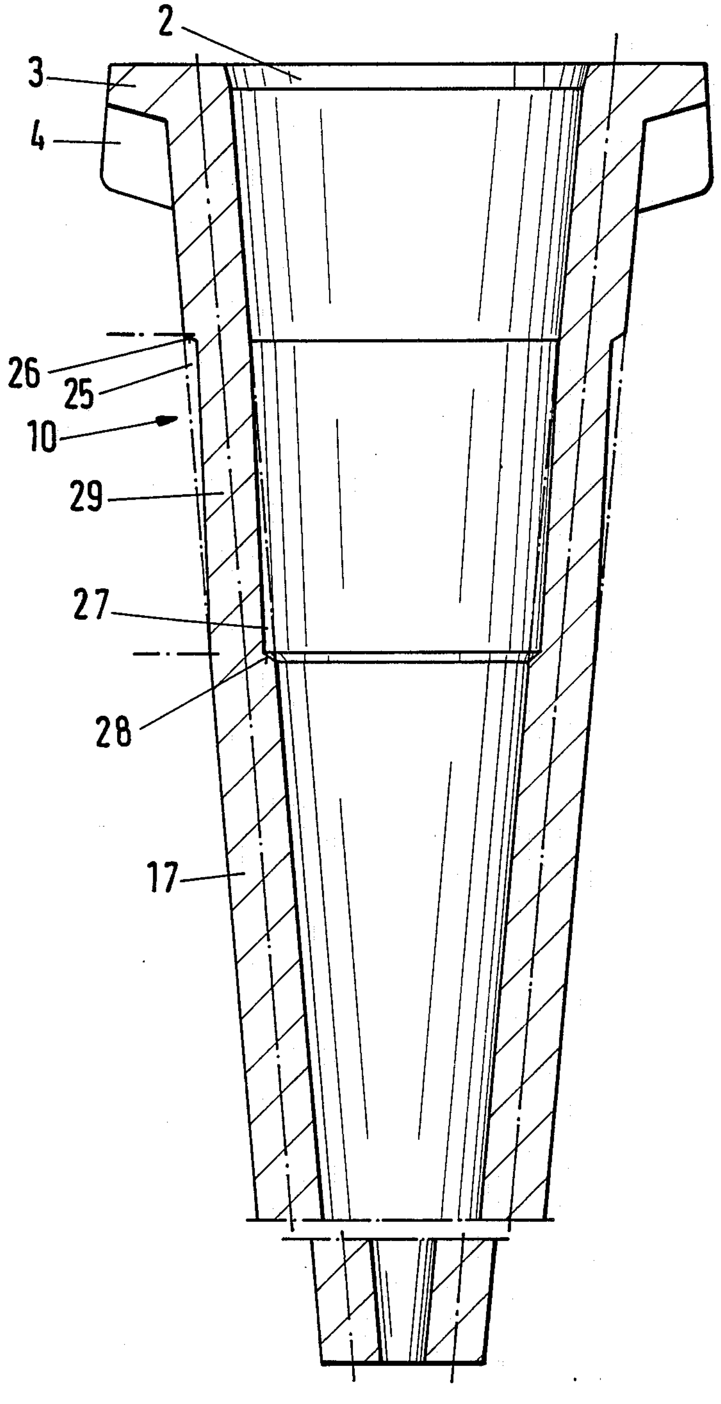
FIG. 3 is a fragmentary vertical longitudinal sectional view showing a wall portion provided in a pipette tip near its top opening and having an upwardly flaring, conical sealing portion.

In the embodiment shown in FIG. 3 the outside surface of the wall of the pipette tip is formed with an upwardly extending recess 25, which is terminated at its top by a conical annular shoulder surface 26, and the inside surface of said wall is formed with a downwardly extending recess 27, which is terminated at its bottom end by a conical annular shoulder surface 28. As a result the sealing portion 10 comprises a wall portion 29 in which the wall thickness is smaller than above and below the seating portion and which has a conical seating surface having a taper of about 1:15. That example is indicated to show that the invention also permits the provision of an upwardly flaring sealing portion having a substantially constant wall thickness. The wall portion 29 has a smaller taper than the wall of the pipette tip in general, i.e., than its imaginary bisecting surface.

The top wall portion 3 extending from the top opening 2 is thicker than the wall of the sealing portion and the pipette tip shown in FIG. 3 has a wall portion 17 of normal thickness below the sealing portion.

I claim:

1. A pipette tip, which is adapted to be fitted on a fitting head of a pipette and which constitutes a vessel having at a top end thereof a fitting top opening and at a bottom end thereof a bottom opening for receiving and dispensing a liquid, wherein said top opening is larger in diameter than said bottom opening and the pipette tip comprises a sealing portion which is adapted to contact the fitting head and which is spaced from the top end of the pipette tip and has a smooth inside surface and has a smaller wall thickness than other wall portions of the pipette tip so that said sealing portion is yieldable and adaptable, said pipette tip is formed in said sealing portion with a first recess (11, 21, 25) in the outside surface and with a second recess (15, 19, 27) in the inside surface of the wall of the pipette tip.

2. A pipette tip according to claim 1, wherein said recess (11, 25) in the outside surface increases in depth in an upward direction toward said top opening and is terminated at its top end by an upwardly flaring, annular shoulder surface (14, 26) leading to a wall portion having the normal wall thickness and said recess (15, 27) in the inside surface increases in depth in a downward direction and is terminated at its bottom end by a downwardly flaring, annular shoulder surface (16, 28).

3. A pipette tip according to claim 2, in which a recess (11, 21, 25) formed in the outside surface and having an upwardly increasing depth and a recess (15, 19, 27) having a downwardly increasing depth overlap in a defined sealing portion (10).

4. A pipette tip according to claim 3, wherein recesses (11, 21, 25; 15, 19, 27) formed in the outside and inside surfaces and increasing in depth in mutually opposite directions define between them in the sealing portion (10) of the pipette tip (1) a wall portion (18, 29) which has substantially parallel surfaces.

5. A pipette tip according to claim 4, which is conical at least in part in the sealing portion so that the sealing portion has a larger opening adjacent to the top opening and in which the recesses (27, 25) formed in the inside and outside surface increase in depth in mutually opposite direction and define a wall portion (29), which extends at an oblique angle to the imaginary bisecting surface of a portion (3, 17) of the conical pipette tip (1) that is axially outside said sealing portion (10) and said wall portion has at least a smaller taper than said imaginary bisecting surface.

6. A pipette tip according to claim 4, which is conical and in which the recesses (11, 15) formed in the inside and outside surfaces define a wall portion which extends at an oblique angle to the imaginary bisecting surface (9) of a portion (3, 17) of the conical pipette tip (1) that is axially outside said sealing portion (10) and said wall portion substantially cylindrically surrounds the center line of the pipette tip.

7. A pipette tip according to claim 4, which is conical and in which the recesses (11, 15) formed in the inside and outside surfaces define a wall portion which extends at an oblique angle to the imaginary bisecting surface (9) of a portion (3, 17) of the conical pipette tip (1) that is axially outside said sealing portion (10) and said wall portion and which constitutes a downwardly flaring cone, which surrounds the center line of the pipette tip and is tapered in a direction which is opposite to the taper of the conical continuous wall (3, 17) of the pipette tip.

8. A pipette tip according to claim 3, which comprises a cylindrical wall portion and in which a cylindrical recess (19) in the inside surface and a cylindrical recess (21) in the outside surface are formed on said cylindrical wall portion and overlap in said sealing portion (10).

9. A pipette tip according to claim 2, wherein the downwardly flaring, conical annular shoulder surface (16, 28) formed in the inside surface has a small taper of an order of 30 degrees.

* * * * *